US012563603B2

(12) United States Patent
Ohseki et al.

(10) Patent No.: US 12,563,603 B2
(45) Date of Patent: Feb. 24, 2026

(54) TERMINAL APPARATUS, BASE STATION APPARATUS, CONTROL METHOD, AND COMPUTER-READABLE STORAGE MEDIUM FOR COVERAGE EXPANSION IN RANDOM ACCESS PROCEDURE

(71) Applicant: KDDI CORPORATION, Tokyo (JP)

(72) Inventors: Takeo Ohseki, Fujimino (JP); Junya Yamazaki, Fujimino (JP); Kosuke Yamazaki, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 326 days.

(21) Appl. No.: 18/466,406

(22) Filed: Sep. 13, 2023

(65) Prior Publication Data

US 2023/0422315 A1      Dec. 28, 2023

Related U.S. Application Data

(63) Continuation of application No. PCT/JP2021/048090, filed on Dec. 24, 2021.

(30) Foreign Application Priority Data

Mar. 30, 2021      (JP) ................................. 2021-057798

(51) Int. Cl.
H04W 74/0833      (2024.01)
H04W 74/08      (2024.01)
(52) U.S. Cl.
CPC ...  H04W 74/0833 (2013.01); H04W 74/0866 (2013.01)
(58) Field of Classification Search
None
See application file for complete search history.

(56) References Cited

U.S. PATENT DOCUMENTS

2018/0220450 A1* 8/2018 Aiba ................... H04W 74/004
2021/0378017 A1* 12/2021 Luo ....................... H04L 5/0044
2022/0015149 A1* 1/2022 Ly ....................... H04W 74/006
2022/0053566 A1* 2/2022 Taherzadeh Boroujeni ...............
                                                        H04W 74/002

(Continued)

FOREIGN PATENT DOCUMENTS

JP      2021-502035 A      1/2021

OTHER PUBLICATIONS

European search report dated Jul. 31, 2024, concerning the corresponding European Patent Application No. 21935224.2 (12 pages).

(Continued)

*Primary Examiner* — Yaotang Wang
(74) *Attorney, Agent, or Firm* — Foley & Lardner LLP

(57)      ABSTRACT

A terminal apparatus specifies, based on capability information of the terminal apparatus, one of a first resource with which an apparatus that is not capable of performing repeated transmission of a message 3 in a four-step random access procedure in consecutive slots can transmit a random access preamble, and a second resource that is different from the first resource and with which an apparatus that is capable of performing repeated transmission of the message 3 in consecutive slots can transmit the random access preamble, as a resource to be used when the terminal apparatus transmits the random access preamble, and transmits the random access preamble to a base station apparatus with the specified resource.

15 Claims, 3 Drawing Sheets

(56) References Cited

U.S. PATENT DOCUMENTS

| | | | |
|---|---|---|---|
| 2022/0150984 A1* | 5/2022 | Taherzadeh Boroujeni | ................ H04L 1/1864 |
| 2022/0232640 A1* | 7/2022 | Lee | ................... H04W 72/1268 |
| 2023/0363012 A1* | 11/2023 | Xu | ........................ H04W 74/04 |

OTHER PUBLICATIONS

Moderator (ZTE Corporation): "Feature lead summary on support of Type A PUSCH repetitions for Msg3," 3GPP TSG RAN W1 #104-e; RI-2102226, 3rd Generation Partnership Project (3GPP), Mobile Competence Centre; 650, Route Des Lucioles; F-06921 Sophia-Antipolis Cedex ; France, vol. RAN WG1, no. e-Meeting; Jan. 25, 2021-Feb. 5, 2021, Feb. 8, 2021 paragraph [02.4]—paragraph [02.5] (78 pages).

Xiaomi: "Discussion on Type A PUSCH repetition for Msg3", 3GPP TSG RAN WG1 #104-e R1-2101130 e-Meeting, Jan. 25-Feb. 5, 83rd Generation Partnership Project (8GPP), Mobile Competence Centre, 650, Route Des Lucioles, F-06921 Sophia-Antipolis Cedex, France vol. RAN WG1, No. e-Meeting, Jan. 25, 2021-Feb. 5, 2021, Jan. 18, 2021. Retrieved from the Internet: URL:https://ftp.3gpp.org/tsg_ran/WG1_RL1/TSGR1_104-e/Docs/R1-2101130.zip R1-2101130.doc (5 pages).

China Telecom, "New WID on NR coverage enhancements", 3GPP TSG RAN meeting #90e RP-202928, Dec. 7, 2020-Dec. 11, 2020 (5 pages).

NEC, "Discussion on Msg3 coverage enhancement", 3GPP TSO RAN WGI #103-e R1-2008080, Oct. 26, 2020-Nov. 13, 2020, https://www.3gpp.org/ftp/TSG_RAN'WGI_RLI/TSGR1_103-e/Docs/RI-2008080.zip (3 pages).

Samsung, "Type A POSCH repetitions for Msg3", 3GPP TSG RAN WG 1 #104-e R1-2101225, Jan. 25, 2021-Feb. 5, 2021, https://www.3gpp.org/ftp/tsg_ran/WGI_RLI/TSGR1_104-e/Docs/RI-2101225.zip (5 pages).

Japanese Office Action concerning the corresponding Japanese Patent Application No. 2021-057798 dated May 17, 2024 (9 pages).

Samsung, vivo, "Discussion on Type A PUSCH repetition for Msg3", 3GPP TSG RAN WG 1 #104-e R1-2100461, Jan. 25, 2021-Feb. 5, 2021 (7 pages).

* cited by examiner

F I G. 1
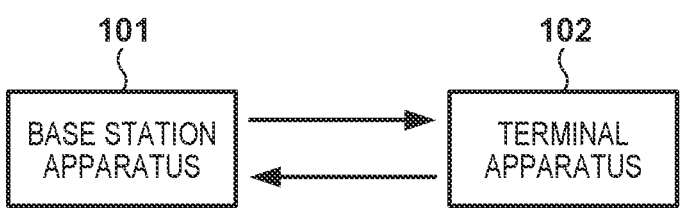
F I G. 2
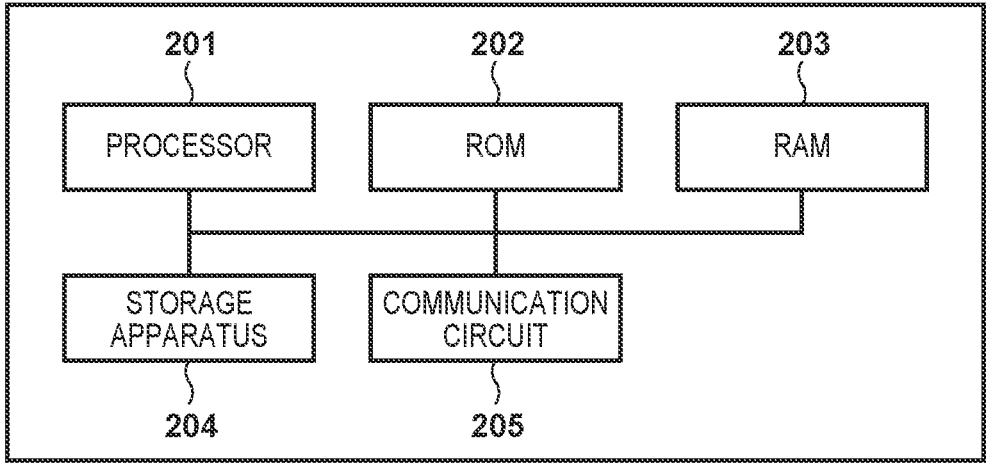

F I G. 3
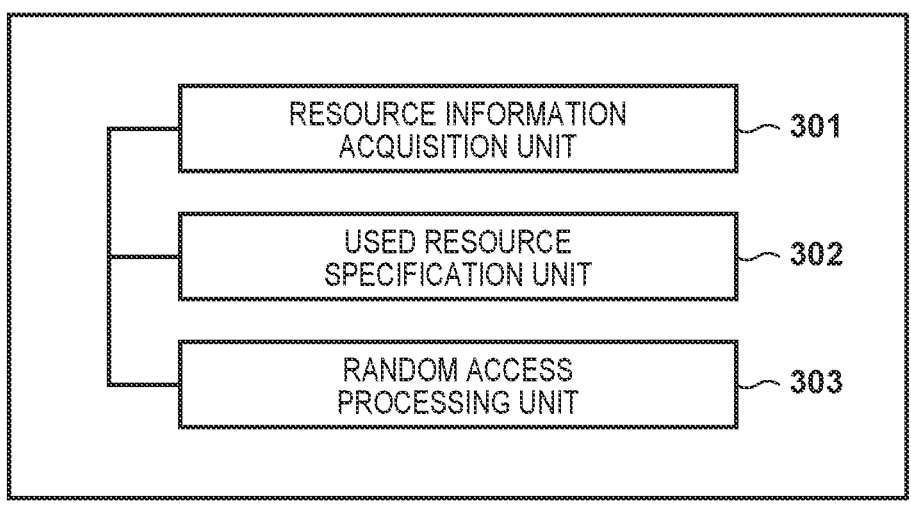
F I G. 4
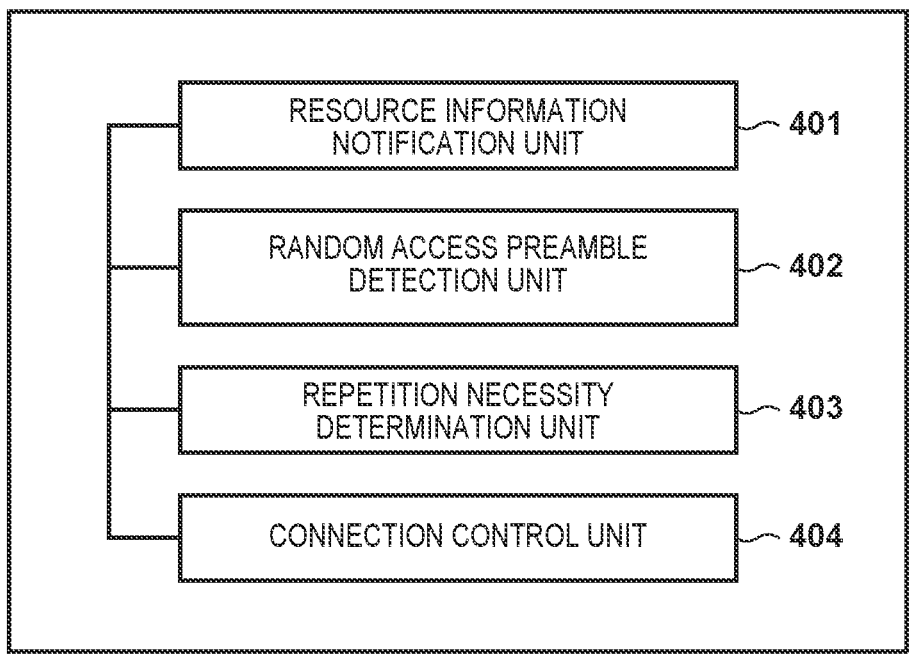

1

TERMINAL APPARATUS, BASE STATION APPARATUS, CONTROL METHOD, AND COMPUTER-READABLE STORAGE MEDIUM FOR COVERAGE EXPANSION IN RANDOM ACCESS PROCEDURE

CROSS-REFERENCE TO RELATED APPLICATION(S)

This application is a continuation of International Patent Application No. PCT/JP2021/048090 filed on Dec. 24, 2021, which claims priority to and the benefit of Japanese Patent Application No. 2021-057798 filed Mar. 30, 2021, the entire disclosures of which are incorporated herein by reference.

BACKGROUND OF THE INVENTION

Field of the Invention

The present invention relates to a coverage expansion technique in a random access procedure.

Description of the Related Art

The 3rd Generation Partnership Project (3GPP) cellular communication standard specifies that a terminal apparatus performs a random access procedure when connecting to a base station apparatus. In the random access procedure, first, the terminal apparatus transmits a message 1 (random access preamble) to the base station apparatus using predetermined frequency/time resources for the random access procedure. In response to detecting the message 1, the base station apparatus transmits a message 2 (random access response) including a transmission timing and resource allocation information for an uplink (link in the direction of transmission from the terminal apparatus to the base station apparatus). Then, the terminal apparatus uses the timing and allocated resources specified by the message 2 to transmit a message 3 requesting connection on an RRC (radio resource control) layer to the base station apparatus. In response to the message 3, the base station apparatus transmits a message 4 including control information for RRC connection and the like to the terminal apparatus. This procedure enables the terminal apparatus to establish connection with the base station apparatus.

Conventional cellular communication standards specify techniques for expanding coverage by repeatedly transmitting the same data in consecutive time slots. In the standardization task of the 3GPP Release 17 standard, application of this coverage expansion technique to the above-mentioned message 3 of the random access procedure is under consideration (3GPP, RP-202928, December 2020). Repeated transmission of the message 3 enables terminal apparatuses present in a wider area to connect to the base station apparatus.

The base station apparatus instructs repeated transmission in the message 2, which causes a terminal apparatus conforming to the standard of Release 17 to repeatedly transmit the message 3. However, the base station apparatus cannot recognize whether the terminal apparatus conforms to the standard of Release 17 at the stage of receiving the message 1 from the terminal apparatus. For this reason, the base station apparatus may also instruct a terminal apparatus conforming to the standard of Release 16 or earlier to repeatedly perform transmission. As a result, although time slots for repeated transmission are allocated to the terminal apparatus, the time slots are not used, resulting in degradation of the frequency utilization efficiency.

SUMMARY OF THE INVENTION

The present invention provides a technique that enables efficient repeated transmission of a message for coverage expansion in a random access procedure.

A terminal apparatus according to one aspect of the present invention comprises at least one processor; and at least one memory that stores a computer-readable instruction for causing, when executed by the at least one processor, the at least one processor to: specify, based on capability information of the terminal apparatus, one of a first resource with which an apparatus that is not capable of performing repeated transmission of a message 3 in a four-step random access procedure in consecutive slots can transmit a random access preamble, and a second resource that is different from the first resource and with which an apparatus that is capable of performing repeated transmission of the message 3 in consecutive slots can transmit the random access preamble, as a resource to be used when the terminal apparatus transmits the random access preamble, and transmit the random access preamble to a base station apparatus with the specified resource.

A base station apparatus according to one aspect of the present invention comprises at least one processor; and at least one memory that stores a computer-readable instruction for causing, when executed by the at least one processor, the at least one processor to: detect a random access preamble transmitted from a terminal apparatus, with a first resource with which an apparatus that is not capable of performing repeated transmission of a message 3 in a four-step random access procedure in consecutive slots can transmit the random access preamble, and with a second resource that is different from the first resource and with which an apparatus that is capable of performing repeated transmission of the message 3 in consecutive slots can transmit the random access preamble, determine whether to instruct the terminal apparatus to perform the repeated transmission of the message 3 based on whether the random access preamble is detected with the first resource or the second resource, and control connection with the terminal apparatus based on the determination.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a diagram showing a configuration example of a radio communication system.

FIG. 2 is a diagram showing a hardware configuration example of a base station apparatus and a terminal apparatus.

FIG. 3 is a diagram illustrating an example of a functional configuration of a terminal apparatus.

FIG. 4 is a diagram illustrating an example of a functional configuration of a base station apparatus.

DESCRIPTION OF THE EMBODIMENTS

Figure 5:
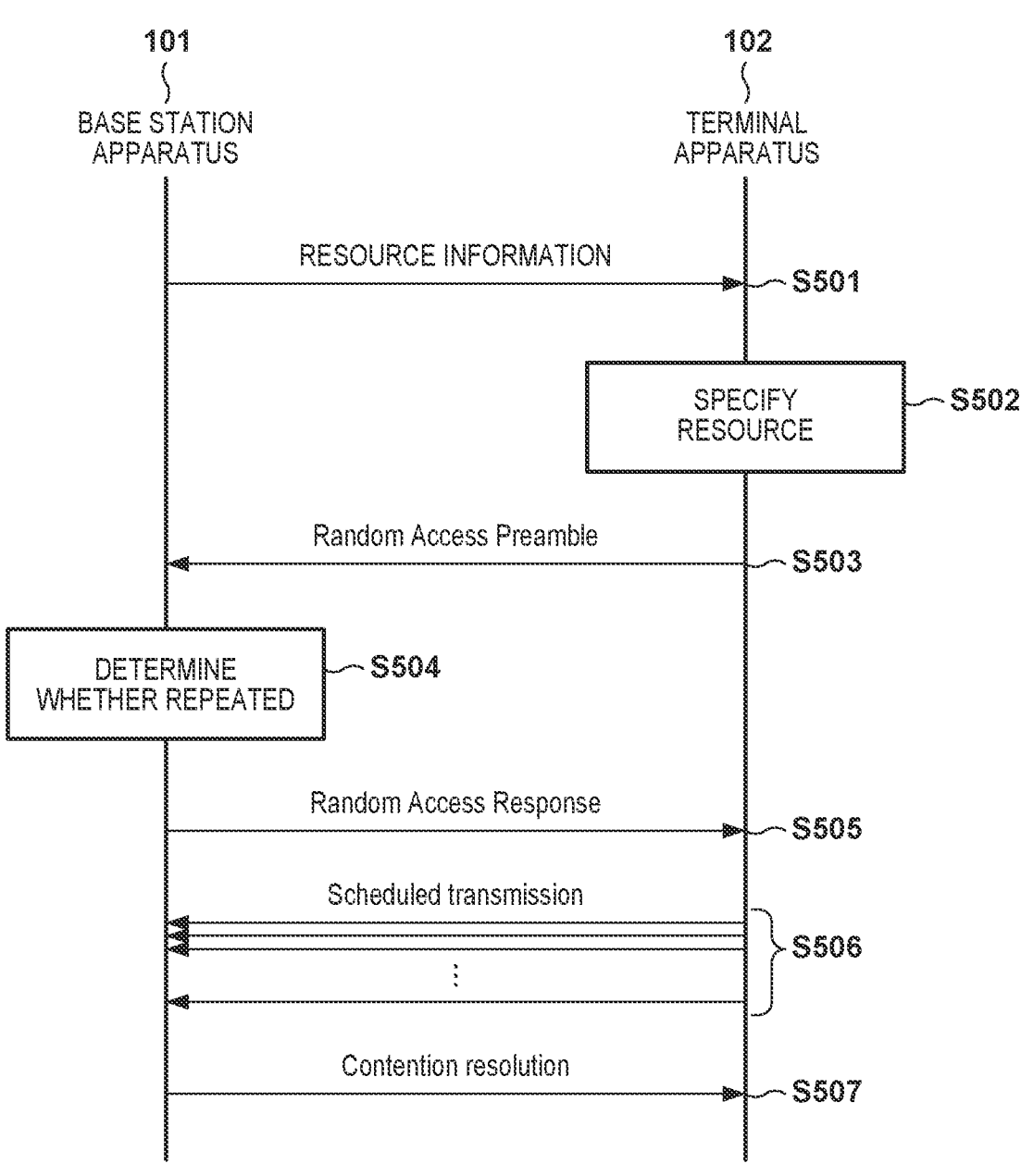
FIG. 5 is a diagram for outlining a flow of processing executed in a radio communication system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

FIG. 1 shows a configuration example of a wireless communication system according to this embodiment. This radio communication system can be a cellular communication system including a base station apparatus 101 and a terminal apparatus 102. The base station apparatus 101 and the terminal apparatus 102 perform wireless communication according to any generation of the 3GPP cellular wireless communication standard. For example, the base station apparatus 101 transmits basic control information (e.g., SIB (System Information Block), etc.), and the terminal apparatus 102 acquires the control information. Then, the terminal apparatus 102 establishes a connection with the base station apparatus 101 by executing a random access procedure based on the control information.

Random access procedures include a four-step procedure and a two-step procedure.

In the four-step random access procedure, first, the terminal apparatus 102 transmits a random access preamble (message 1) using the time/frequency resources for random access preamble transmission specified by control information transmitted from the base station apparatus 101. As a random access preamble, a sequence known to both the base station apparatus 101 and the terminal apparatus 102 is transmitted. The base station apparatus 101 can detect the reception of the random access preamble by performing correlation detection using the known sequence on the signal received with the resources for the random access procedure. A sequence to be transmitted as a random access preamble is generated by applying a Cyclic Shift selected by the terminal apparatus 102 from those notified from the base station apparatus 101, to a Zadoff-Chu sequence. By using such sequences, even if multiple terminal apparatuses transmit random access preambles in parallel, as long as different Cyclic Shifts are used, the base station apparatus 101 can detect these random access preambles separately.

Upon receiving the random access preamble, the base station apparatus 101 transmits a random access response (message 2) to the terminal apparatus 102 in response. In the message 2, control information such as information indicating the timing (timing advance) when the terminal apparatus 102 transmits a signal and designation of time/frequency resources for the subsequent message 3 transmission is transmitted to the terminal apparatus 102. The terminal apparatus 102 transmits to the base station apparatus 101 a message 3 requesting connection on the RRC (Radio Resource Control) layer using the timing and allocated resources specified by the message 2. In response to the message 3, the base station apparatus 101 transmits a message 4 including control information for RRC connection and the like to the terminal apparatus 102. This procedure allows the terminal apparatus 102 to establish a connection with the base station apparatus 101. Note that the base station apparatus 101 can cause the terminal apparatus 102 to retransmit the message 3 if the base station apparatus 101 fails to receive the message 3. Note that if the base station apparatus 101 does not succeed in receiving the message 3 even after retransmission is performed a predetermined number of times, it is determined that the terminal apparatus 102 has failed to connect with the base station apparatus 101.

Note that in the two-step random access procedure, the terminal apparatus 102 transmits a first message corresponding to the message 1 and the message 3 described above, and the base station apparatus 101 responds thereto by transmitting a second message corresponding to the message 2 and the message 4 described above. Note that, for example, even if the base station apparatus 101 detects the random access preamble part of the first message, if the message 3 part cannot be decoded, the base station apparatus 101 may transition to a four-step random access procedure and cause the terminal apparatus 102 to retransmit the message 3.

In cellular communication systems, a coverage expansion technique implemented through a method of repeatedly transmitting the same data in consecutive time slots is specified. In this method, the same data is repeatedly transmitted from the initial transmission, instead of performing retransmission when data reception fails on the receiving side. In the apparatus on the receiving side, it is possible to improve radio quality using the gain obtained by repeatedly receiving the same data, and communication can be performed between the terminal apparatus 102 and the base station apparatus 101 located at positions where communication cannot be performed through one instance of transmission.

Conventional repeated transmission is performed after connection is established. On the other hand, as mentioned above, consideration has been given to applying repeated transmission to the message 3 of the random access procedure at the time of establishing connection. However, the base station apparatus 101 cannot recognize whether or not the terminal apparatus 102 supports repeated transmission of the message 3 at the stage of transmitting the message 2. Even if the terminal apparatus 102 does not support repeated transmission of the message 3, the base station apparatus 101 can instruct repeated transmission of message 3 and reserve resources for the repeated transmission. However, if the terminal apparatus 102 does not support repeated transmission of message 3, the terminal apparatus 102 will not be able to recognize the repeated transmission instruction and will transmit the message 3 only once. As a result, the radio resources for repeated transmission of the message 3 ensured by base station apparatus 101 will not be used, and frequency utilization efficiency will decrease.

For this reason, in the present embodiment, the base station apparatus 101 can determine whether or not the terminal apparatus 102 supports repeated transmission of the message 3 at the message 1 stage.

In this embodiment, a first resource with which a terminal apparatus that is not capable of performing repeated transmission of the message 3 in consecutive slots in a four-step random access procedure is capable of transmitting the message 1 (random access preamble), and a second resource that is different from the first resource and with which a terminal apparatus that can repeatedly transmit the message 3 in consecutive slots to transmit the message 1 are prepared. Here, the first resource and the second resource are set as resources with mutually different times and/or frequencies, for example. For example, the first resource and the second resource may be different frequency resources in the same time slot, different time slots in the same frequency, or resources with different time slots and frequency resources. Additionally or alternatively, the first resource and the second resource may be set such that the codes to be used for the message 1 are different. Note that, for the code, for example, the base sequences of the Zadoff-Chu sequence may be different for the first resource and the second resource, and in addition to or instead of this, the Cyclic Shift values may be different for the first resource and the second resource. Note that the first resource and the second resource may be set differently depending on factors other than these.

The terminal apparatus 102 selects the resource to be used when transmitting the message 1 from the first resource and the second resource based on the capability information (UE Capability) of the terminal apparatus 102. The terminal apparatus 102 then transmits the message 1 with the selected resource. The terminal apparatus 102 does not use the second resource if the terminal apparatus 102 does not support repeated transmission of the message 3. That is, only a terminal apparatus that supports repeated transmission of the message 3 transmits the second resource. In addition, even if the terminal apparatus 102 supports repeated transmission of the message 3, if the terminal apparatus 102 does not indicate to the base station apparatus 101 that repeated transmission of the message 3 is supported, the terminal apparatus 102 transmits the message 1 with the first resource. On the other hand, if the terminal apparatus 102 supports repeated transmission of the message 3 and indicates to base station apparatus 101 that repeated transmission of the message 3 is supported, the terminal apparatus 102 transmits the message 1 using the second resource. That is, the first resource can be used by all terminal apparatuses regardless of whether or not repeated transmission of the message 3 is supported, and the second resource can be used only by terminal apparatuses that support repeated transmission of the message 3 only when the terminal apparatuses are to notify the base station apparatus 101 that the terminal apparatuses support repeated transmission.

As an example, a terminal apparatus 102 that supports repeated transmission of the message 3 may transmit the message 1 using the first resource if it is determined that the radio quality is sufficiently high when receiving a synchronization signal or notification signal sent from the base station apparatus 101 and that repeated transmission of the message 3 is unnecessary. Note that this is an example, and the terminal apparatus 102 may also transmit the message 1 using the first resource if it is determined that repeated transmission of the message 3 is unnecessary due to other factors. For example, according to the type of service to be provided, the terminal apparatus 102 may transmit the message 1 using the second resource when performing communication of a service type in which communication reliability is prioritized, and may transmit the message 1 using the first resource otherwise.

The base station apparatus 101 executes processing for detecting the message 1 with the above-described first resource and second resource. Then, the base station apparatus 101 determines whether or not to instruct the terminal apparatus 102 to perform repeated transmission of the message 3 based on whether the resource with which the message 1 was detected is the first resource or the second resource, and based on the determination result, the base station apparatus 101 executes control for subsequent connection establishment. When the base station apparatus 101 detects the message 1 from the terminal apparatus 102 with the first resource, the base station apparatus 101 does not instruct the terminal apparatus 102 to perform repeated transmission of the message 3. That is, since it is conceivable that the terminal apparatus that transmits the message 1 with the first resource does not support repeated transmission of the message 3 or does not require repeated transmission of the message 3, such a terminal apparatus is not instructed to perform repeated transmission.

On the other hand, when the base station apparatus 101 detects the message 1 from the terminal apparatus 102 with the second resource, the base station apparatus 101 can further determine whether or not to instruct the terminal apparatus 102 to perform repeated transmission of the message 3. That is, even if the base station apparatus 101 detects the message 1 from the terminal apparatus 102 with the second resource, the base station apparatus 101 may not necessarily instruct the terminal apparatus 102 to perform repeated transmission of the message 3. In one example, the base station apparatus 101 can determine whether to cause the terminal apparatus 102 to perform repeated transmission of the message 3 based on the radio quality such as the reception intensity of the message 1. That is, if the radio quality such as the reception intensity of the message 1 is sufficiently high, the base station apparatus 101 determines that the probability of successfully receiving the message 3 is sufficiently high even without repeated transmission of the message 3, and can determine that the terminal apparatus 102 is not to be instructed to perform repeated transmission of the message 3. On the other hand, the base station apparatus 101 can instruct the terminal apparatus 102 to perform repeated transmission of the message 3 if the radio quality such as the reception intensity of the message 1 is a certain level or lower. Note that when the base station apparatus 101 transmits an instruction to perform repeated transmission of the message 3 to the terminal apparatus 102, the base station apparatus 101 transmits the instruction in the message 2.

The base station apparatus 101 transmits information indicating the first resource and the second resource such that the first resource and the second resource are distinguishable from each other to the terminal apparatus 102. For example, an information element of an SIB that can be interpreted by a terminal apparatus of Release 16 or earlier can indicate the information of the first resource, and an information element of an SIB that can be interpreted by a terminal apparatus of Release 17 or later can indicate the information of the second resource. According to this, a terminal apparatus of Release 16 cannot interpret an information element that can be interpreted by a terminal apparatus of Release 17 or later, and therefore can acquire only the information of the first resource. On the other hand, a terminal apparatus of Release 17 can interpret both an information element that can be interpreted by a terminal apparatus of Release 16 or earlier and an information element that can be interpreted by a terminal apparatus of Release 17 or later, and therefore can acquire both the information of the first resource and the information of the second resource. Note that this is an example, and notification of the information of the second resource can be performed with an information element that is ignored by terminal apparatuses that do not support repeated transmission of the message 3. By acquiring such information, the terminal apparatus 102 can distinguish between and specify the first resource and the second resource.

Note that when using the two-step random access procedure, the terminal apparatus 102 can transmit the random access preamble portion of the first message with either the first resource or the second resource as described above. When the base station apparatus 101 detects the random access preamble portion of the first message, successfully decodes the remaining portion, and establishes a connection, the base station apparatus 101 transmits the second message to the terminal apparatus 102 in the same manner regardless of whether the resource with which the random access preamble portion is transmitted is the first resource or the second resource. On the other hand, if the base station apparatus 101 detects the random access preamble portion of the first message but fails to decode the remaining portion, the base station apparatus 101 transitions the random access procedure to a four-step random access procedure. In this case, the base station apparatus 101 instructs the terminal apparatus 102 to transmit the message 3, but at this time, for example, if the random access preamble portion is detected in the first resource, the base station apparatus 101 does not instruct the terminal apparatus 102 to perform repeated transmission of the message 3. On the other hand, the base station apparatus 101 can instruct the terminal apparatus 102 to perform repeated transmission of the message 3 as necessary, for example, when the random access preamble portion is detected in the second resource. It is possible to determine whether or not repeated transmission of the message 3 at this time is necessary based on the radio quality at the time of reception of the random access preamble portion and the like, as described above. That is, in the case of transition from a two-step random access procedure to a four-step random access procedure, even if the random access preamble portion is detected in the second resource, repeated transmission of the message 3 may not necessarily be instructed.

Note that the terminal apparatus 102 may transmit the message 1 of the random access procedure in order to establish uplink synchronization. In this case, since the processing is completed up to the message 2, the terminal apparatus 102 may, for example, randomly select either the first resource or the second resource, and transmit the message 1 with the selected resource. This is because the information indicating whether or not the terminal apparatus 102 supports repeated transmission of the message 3 is meaningless as long as the message 3 is not transmitted.
Configuration of Apparatus Next, a hardware configuration example of the base station apparatus 101 and the terminal apparatus 102 that execute the processing described above will be described with reference to FIG. 2. The base station apparatus 101 and the terminal apparatus 102 are constituted by including, in one example, a processor 201, a ROM 202, a RAM 203, a storage apparatus 204, and a communication circuit 205. The processor 201 is a computer that includes one or more processing circuits such as a general-purpose CPU (central processing unit) and ASIC (application-specific integrated circuit), and reads out and executes programs stored in the ROM 202 and the storage device 204 to perform the overall processing of the base station apparatus 101 and the terminal apparatus 102 and the above-described processing. The ROM 202 is a read-only memory that stores information such as programs related to processing executed by the base station apparatus 101 and the terminal apparatus 102 and various parameters. The RAM 203 is a random access memory that functions as a workspace when the processor 201 executes programs and stores temporary information. The storage apparatus 204 is constituted by, for example, a detachable external storage apparatus or the like. The communication circuit 205 is constituted by, for example, a 5G wireless communication circuit. Note that although one communication circuit 205 is illustrated in FIG. 2, the base station apparatus 101 and the terminal apparatus 102 can have multiple communication circuits. For example, the base station apparatus 101 and the terminal apparatus 102 may have separate communication circuits 205 for each of a plurality of usable frequency bands. Also, the base station apparatus 101 and the terminal apparatus 102 may have a common communication circuit 205 for at least some of the plurality of frequency bands. Also, for example, the terminal apparatus 102 may have not only the communication circuit 205 for cellular communication, but also the communication circuit 205 compatible with other wireless communication standards such as wireless LAN.

FIG. 3 is a diagram showing a functional configuration example of the terminal apparatus 102. The terminal apparatus 102 has, as functions, for example, a resource information acquisition unit 301, a used resource specification unit 302, and a random access processing unit 303. Note that FIG. 3 shows only functions particularly related to the present embodiment, and illustration of other various functions that the terminal apparatus 102 may have is omitted. For example, the terminal 102 naturally has other functions that a terminal apparatus in a cellular communication system typically has. Also, the functional blocks in FIG. 3 are shown schematically, and each functional block may be realized in an integrated manner, or may be further subdivided. Also, each function in FIG. 3 may be realized by, for example, the processor 201 executing a program stored in the ROM 202 or the storage apparatus 204, or may be realized by, for example, the processor inside the communication circuit 205 executing predetermined software. Note that the details of the processing executed by each functional unit will not be described here, and only the general functions thereof will be described.

The resource information acquisition unit 301 specifies resources that can be used for transmitting a random access preamble (message 1 in a four-step random access procedure). Here, a first resource and a second resource different from the first resource are specified as resources that can be used for transmitting the random access preamble. The first resource is a resource with which a terminal apparatus that is not capable of repeatedly transmitting the message 3 in the four-step random access procedure in consecutive slots can transmit a random access preamble. On the other hand, the second resource is a resource with which a terminal apparatus that is capable of repeatedly transmitting the message 3 in consecutive slots can transmit the random access preamble. Note that, as described above, the first resource and the second resource are set as resources that differ in at least one of time, frequency, and code (sequence). The resource information acquisition unit 301 acquires this setting information by receiving SIBs (System Information Blocks) and the like transmitted from the base station apparatus 101. Note that, for example, the terminal apparatus 102 conforming to Release 16 can be notified of the configuration information in a format such that it can acquire the information of the first resource but cannot acquire the information of the second resource. Also, even if the terminal apparatus 102 conforms to Release 17, the terminal apparatus 102 that does not support repeated transmission of the message 3 can acquire the information of the first resource, but notification of the configuration information may be performed in a format such that the information of the second resource cannot be acquired. Note that not being able to acquire the information in this context includes being able to receive the information itself but ignoring or not being able to interpret the content of the information.

Based on at least the capability information of the terminal apparatus 102, the used resource specification unit 302 specifies the resource for transmitting the random access preamble. The used resource specification unit 302 determines which of the first resource and the second resource specified by the resource information acquisition unit 301 is to be used for transmitting the random access preamble. Note that if the terminal apparatus 102 does not support repeated transmission of the message 3, the resource information acquisition unit 301 does not acquire information on the second resource, and therefore the used resource specification unit 302 specifies the first resource as the resource to be used. On the other hand, if the terminal apparatus 102 supports repeated transmission of the message 3, the used resource specification unit 302 can use both the first resource and the second resource, and therefore identifies either of them as the resource to be used. In one example, the used resource specification unit 302 determines that repeated transmission of the message 3 may be necessary when the radio quality such as the reception intensity of the synchronization signal or notification signal from the base station apparatus 101 is less than or equal to a predetermined value, and specifies the second resource as the resource to be used. On the other hand, if it is determined that the radio quality of the signal from the base station apparatus 101 is higher than the predetermined quality and that repeated transmission of the message 3 is not necessary, the used resource specification unit 302 may specify the first resource as the resource to be used. Note that if the second resource can be used (that is, if repeated transmission of the message 3 is supported), the used resource specification unit 302 may specify the second resource as the resource to be used regardless of the radio quality of the signal received from the base station apparatus 101.

The random access processing unit 303 executes random access processing including transmitting a random access preamble with the resource specified by the used resource specification unit 302. For example, the random access processing unit 303 transmits a random access preamble with the specified resource and performs a four-step random access procedure. At this time, for example, if the random access processing unit 303 is instructed to perform repeated transmission of the message 3 by the message 2 (random access response) from the base station apparatus 101, the random access processing unit 303 repeatedly transmits the same message 3 a specified number of times with the time/frequency resource specified by the message 2. The random access processing unit 303 may also execute the two-step random access processing, and in this case, the random access processing unit 303 transmits a random access preamble with the specified resource, and transmits a first message including information corresponding to the message 3 to the base station apparatus 101 with a separately specified resource. The random access processing unit 303 can receive a random access response instructing retransmission of the message 3 from the base station apparatus 101 in response to this first message. In this case, the random access processing unit 303 can transition the processing to a four-step random access procedure, and repeatedly transmit the message 3 the specified number of times with the resource specified by the random access response.

FIG. 4 is a diagram showing an example of a functional configuration of the base station apparatus 101. The base station apparatus 101 has, as functions, for example, a resource information notification unit 401, a random access preamble detection unit 402, a repetition necessity determination unit 403, and a connection control unit 404. Note that FIG. 4 shows only functions particularly related to the present embodiment, and omits illustration of various other functions that the base station apparatus 101 may have. For example, the base station apparatus 101 naturally has other functions that base station apparatuses in a cellular communinication system generally have. Also, the functional blocks in FIG. 4 are shown schematically, and each functional block may be realized in an integrated manner, or may be further subdivided. Also, each function in FIG. 4 may be realized by, for example, the processor 201 executing a program stored in the ROM 202 or the storage device 204, or may be realized by, for example, the processor inside the communication circuit 205 executing predetermined software. Note that the details of the processing executed by each functional unit will not be described here, and only the general functions thereof will be described.

The resource information notification unit 401 performs notification of the first resource and the second resource as described above to the terminal apparatuses present in the area where the base station apparatus 101 is deployed. This notification is performed using a notification signal such as an SIB. Note that the first resource and the second resource are notified such that they are distinguishable from each other. In one example, a notification signal in which information elements are described in a format that allows only terminal apparatuses that conform to a standard of Release 17 or later, or only terminal apparatuses that support repeated transmission of the message 3 to specify the second resource is transmitted. The random access preamble detection unit 402 executes random access preamble detection processing (e.g., correlation detection processing using known sequences) in the first resource and the second resource.

The repetition necessity determination unit 403 determines whether to instruct repeated transmission of the message 3 based at least on whether the resource with which the random access preamble is detected in the random access preamble detection unit 402 is the first resource or the second resource. When a random access preamble from the terminal apparatus 102 is detected with the first resource, the repetition necessity determination unit 403 does not instruct that terminal apparatus 102 to perform repeated transmission of the message 3. On the other hand, when a random access preamble from the terminal apparatus 102 is detected with the second resource, the repetition necessity determination unit 403 determines whether or not to instruct that terminal apparatus 102 to perform repeated transmission of the message 3 based on the radio quality such as the reception intensity of the random access preamble.

The connection control unit 404 executes control for establishing a connection with the terminal apparatus 102 by completing four-step or two-step random access processing. For example, the connection control unit 404 transmits a random access response to the terminal apparatus 102 in response to the random access preamble. Note that when a two-step random access procedure is used, the connection control unit 404 detects the random access preamble included in the first message, and if the remaining part is successfully decoded, the connection control unit 404 transmits the second message to the terminal apparatus 102 to complete establishment of the connection. On the other hand, if the connection control unit 404 detects the random access preamble included in the first message but fails to decode the remaining part, the connection control unit 404 transmits, to the terminal apparatus 102, a message 2 instructing that the message 3 is to be transmitted, and transitions to a four-step random access procedure. Note that when a four-step random access procedure is used, the connection control unit 404 transmits a random access response in response to detection of a random access preamble, and the terminal apparatus 102 transmits the message 3. When performing control such that the terminal apparatus 102 transmits the message 3, for example, the connection control unit 404 transmits a random access response including information indicating whether or not repeated transmission of the message 3 is necessary, the number of repetitions, the resource for the transmission, and the like to the terminal apparatus 102, based on the determination of the repetition necessity determination unit 403.

Flow of Processing

Next, an example of the flow of processing executed by the base station apparatus 101 and the terminal apparatus 102 according to this embodiment will be outlined with reference to FIG. 5. Note that this is an example, and the base station apparatus 101 and the terminal apparatus 102 may perform various types of processing as exemplified above.

In this processing, the base station apparatus 101 performs notification of information indicating resources that can be used for transmission of a random access preamble, to the terminal apparatuses within the area in which the base station apparatus 101 is deployed, for example, using a notification signal such as an SIB (S501). In this notification, for example, notification information including the first resource and the second resource as described above is transmitted. Upon receiving the resource information, the terminal apparatus 102 stores it as a resource to be used for transmitting a random access preamble if it is necessary to establish a connection with the base station apparatus 101 (for example, if a paging channel from the base station apparatus 101 is received or if data to be transmitted is generated inside the terminal apparatus 102). Note that based on the capability information of the terminal apparatus 102, for example, the terminal apparatus 102 can operate such that if the terminal apparatus 102 does not support repeated transmission of the message 3 in the four-step random access procedure, the terminal apparatus 102 stores the first resource, and if the terminal apparatus 102 supports repeated transmission of the message 3, the terminal apparatus 102 stores the second resource. Also, the terminal apparatus 102 may store both the first resource and the second resource if the terminal apparatus 102 supports repeated transmission of the message 3.

Thereafter, the terminal apparatus 102 specifies a resource for transmitting a random access preamble in response to a situation in which connection is to be established with the base station apparatus 101 (S502). The terminal apparatus 102 determines which of the first resource and the second resource to use, for example, based on capability information indicating whether or not the terminal apparatus 102 supports repeated transmission of the message 3. Note that, for example, in step S501, if only one of the first resource and the second resource is stored, the terminal apparatus 102 specifies the stored resource stored as the resource to be used, and therefore there is no need to execute the selection processing. Thereafter, the terminal apparatus 102 uses the resource specified in step S502 to transmit a random access preamble (S503). Here, it is assumed that the terminal apparatus 102 transmits a random access preamble using, for example, the second resource.

Upon detecting a random access preamble transmitted from the terminal apparatus 102, the base station apparatus 101 determines whether or not repeated transmission of the message 3 by the terminal apparatus 102 is necessary based at least on whether the resource with which the random access preamble was detected is the first resource or the second resource (S504). For example, in step S503, the base station apparatus 101 determines whether repeated transmission of the message 3 is necessary based on the radio quality of the random access preamble detected with the second resource. Here, it is assumed that the base station apparatus 101 determines that repeated transmission of the message 3 is necessary. In this case, the base station apparatus 101 transmits, to the terminal apparatus 102, a message 2 (random access response) including information on the timing at which the terminal apparatus 102 is to transmit a signal and information designating the time/frequency resource with which the message 3 is to be transmitted (S505). Here, if the terminal apparatus 102 is to be instructed to perform repeated transmission of the message 3, the base station apparatus 101 performs notification of information designating the number of repetitions in the repeated transmission and the corresponding amount of radio resources. Note that the base station apparatus 101 may, for example, notify the terminal apparatus 102 in advance (for example, at the time of step S501) of candidates for the number of repetitions in the repeated transmission of the message 3, and at the time of step S505, notify the terminal apparatus 102 of which number of repetitions among the candidates is to be used. This makes it possible to suppress the amount of information to be individually notified to the terminal apparatus 102.

Thereafter, the terminal apparatus 102 repeatedly transmits the message 3 with the designated resource by the number of repetitions designated in step S505 (S506). The base station apparatus 101 composites the multiple messages 3 that were repeatedly transmitted to obtain one message 3. Then, when the base station apparatus 101 successfully receives this message 3, the base station apparatus 101 transmits a message 4 to the terminal apparatus 102 (S507) and establishes a connection with the terminal apparatus. Note that the base station apparatus 101 may also instruct the terminal apparatus 102 to retransmit the message 3 if the base station apparatus fails to receive the message 3. Note that at this time, the base station apparatus 101 may perform processing such as increasing the number of repeated transmissions.

As described above, in the present embodiment, it is possible to notify the base station apparatus 101 of whether or not the terminal apparatus 102 supports repeated transmission of the message 3 by using the resource for transmitting the random access preamble. As a result, the base station apparatus 101 can instruct repeated transmission of the message 3 only to the terminal apparatuses that support repeated transmission of the message 3, and can ensure resources for the repeated transmission. This makes it possible to efficiently perform repeated transmission of messages for coverage expansion in a random access procedure.

According to the present invention, it is possible to efficiently perform repeated transmission of a message for coverage expansion in a random access procedure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A terminal apparatus, comprising:
at least one processor; and
at least one memory that stores a computer-readable instruction for causing, when executed by the at least one processor, the at least one processor to:
specify, based on capability information of the terminal apparatus, one of a first resource with which an apparatus that is not capable of performing repeated transmission of a message 3 in a four-step random access procedure in consecutive slots can transmit a random access preamble, and a second resource that is different from the first resource and with which an apparatus that is capable of performing repeated transmission of the message 3 in consecutive slots can transmit the random access preamble, as a resource to be used when the terminal apparatus transmits the random access preamble, and transmit the random access preamble to a base station apparatus with the specified resource.

2. The terminal apparatus according to claim 1, wherein the terminal apparatus specifies the second resource if it is indicated to the base station apparatus that the repeated transmission can be performed and that repeated transmission of the message 3 can be performed in consecutive slots.

3. The terminal apparatus according to claim 1, wherein the terminal apparatus specifies the first resource if the repeated transmission cannot be performed or if it is not indicated to the base station apparatus that repeated transmission of the message 3 can be performed in consecutive slots.

4. The terminal apparatus according to claim 1, wherein the computer-readable instruction further causes, when executed by the at least one processor, the at least one processor to acquire, from the base station apparatus, information indicating the first resource and the second resource such that the first resource and the second resource are distinguishable from each other.

5. The terminal apparatus according to claim 1, wherein when using a two-step random access procedure, the terminal apparatus transmits a random access preamble part of a message to be transmitted to the base station apparatus in the random access procedure, with the specified resource.

6. The terminal apparatus according to claim 1, wherein the first resource and the second resource are set such that at least one of a frequency, a time, and a code to be used for the random access preamble is different.

7. A base station apparatus, comprising:

at least one processor; and at least one memory that stores a computer-readable instruction for causing, when executed by the at least one processor, the at least one processor to:

detect a random access preamble transmitted from a terminal apparatus, with a first resource with which an apparatus that is not capable of performing repeated transmission of a message 3 in a four-step random access procedure in consecutive slots can transmit the random access preamble, and with a second resource that is different from the first resource and with which an apparatus that is capable of performing repeated transmission of the message 3 in consecutive slots can transmit the random access preamble, determine whether to instruct the terminal apparatus to perform the repeated transmission of the message 3 based on whether the random access preamble is detected with the first resource or the second resource, and control connection with the terminal apparatus based on the determination.

8. The base station apparatus according to claim 7, wherein the base station apparatus determines that the repeated transmission of the message 3 is not to be instructed when the random access preamble is detected with the first resource.

9. The base station apparatus according to claim 7, wherein if the random access preamble is detected with the second resource, the base station apparatus determines whether or not to instruct the terminal apparatus to perform the repeated transmission of the message 3.

10. The base station according to claim 9, wherein based on a radio quality of the random access preamble detected with the second resource from the terminal apparatus, the base station apparatus determines that the terminal apparatus can execute the repeated transmission of the message 3 and determines whether to instruct the terminal apparatus to perform the repeated transmission of the message 3.

11. The base station apparatus according to claim 7, wherein the first resource and the second resource are set such that at least one of a frequency, a time, and a code to be used for the random access preamble is different.

12. A control method to be executed by a terminal apparatus, comprising:

specifying, based on capability information of the terminal apparatus, one of a first resource with which an apparatus that is not capable of performing repeated transmission of a message 3 in a four-step random access procedure in consecutive slots can transmit a random access preamble, and a second resource that is different from the first resource and with which an apparatus that is capable of performing repeated transmission the message 3 in consecutive slots can transmit the random access preamble, as a resource to be used when the terminal apparatus transmits the random access preamble; and transmitting the random access preamble to a base station apparatus with the specified resource.

13. A control method to be executed by a base station apparatus, comprising:

detecting a random access preamble transmitted from a terminal apparatus, with a first resource with which an apparatus that is not capable of performing repeated transmission of a message 3 in a four-step random access procedure in consecutive slots can transmit the random access preamble, and with a second resource that is different from the first resource and with which an apparatus that is capable of performing repeated transmission of the message 3 in consecutive slots can transmit the random access preamble;

determining whether to instruct the terminal apparatus to execute the repeated transmission of the message 3 based on whether the random access preamble is detected with the first resource or the second resource; and controlling connection with the terminal apparatus based on the determination.

14. A non-transitory computer-readable storage medium that stores a program for causing a computer installed in a terminal apparatus to:

specify, based on capability information of the terminal apparatus, one of a first resource with which an apparatus that is not capable of performing repeated transmission of a message 3 in a four-step random access procedure in consecutive slots can transmit a random access preamble, and a second resource that is different from the first resource and with which an apparatus that is capable of performing repeated transmission of the message 3 in consecutive slots can transmit the random access preamble, as a resource to be used when the terminal apparatus transmits the random access preamble; and transmit the random access preamble to a base station apparatus with the specified resource.

15. A non-transitory computer-readable storage medium that stores a program for causing a computer provided in a base station apparatus to:

> detect a random access preamble transmitted from a terminal apparatus, with a first resource with which an apparatus that is not capable of performing repeated transmission of a message 3 in a four-step random access procedure in consecutive slots can transmit the random access preamble, and with a second resource that is different from the first resource and with which an apparatus that is capable of performing repeated transmission of the message 3 in consecutive slots can transmit the random access preamble;
>
> determine whether to instruct the terminal apparatus to execute the repeated transmission of the message 3 based on whether the random access preamble is detected with the first resource or the second resource; and
>
> controlling connection with the terminal apparatus based on the determination.

\* \* \* \* \*